US012342080B2

United States Patent
Lin et al.

(10) Patent No.: US 12,342,080 B2
(45) Date of Patent: Jun. 24, 2025

(54) SYSTEM AND METHOD OF ENABLING OBJECT AUTO-FRAMING ON WEBCAM THROUGH AN INDICATOR

(71) Applicant: Dell Products L.P., Round Rock, TX (US)

(72) Inventors: Yi Hsien Lin, Taiwan (TW); Chih-Hao Kao, Singapore (SG); Chien Chih Liao, Taipei (TW); Shohrab Sheikh, Singapore (SG); Wei Wei Wilson Chua, Singapore (SG); Seong Yong Kim, Singapore (SG)

(73) Assignee: Dell Products L.P., Round Rock, TX (US)

( * ) Notice: Subject to any disclaimer, the term of this patent is extended or adjusted under 35 U.S.C. 154(b) by 138 days.

(21) Appl. No.: 18/140,770

(22) Filed: Apr. 28, 2023

(65) Prior Publication Data

US 2024/0365005 A1    Oct. 31, 2024

(51) Int. Cl.
| | |
|---|---|
| *H04N 23/695* | (2023.01) |
| *G06F 3/0354* | (2013.01) |
| *H04N 23/611* | (2023.01) |
| *H04N 23/63* | (2023.01) |

(52) U.S. Cl.
CPC ....... *H04N 23/695* (2023.01); *G06F 3/03545* (2013.01); *H04N 23/611* (2023.01); *H04N 23/635* (2023.01)

(58) Field of Classification Search
CPC .. H04N 23/611; H04N 23/635; H04N 23/695; G06F 3/03545
USPC ........................................ 348/240.2
See application file for complete search history.

(56) References Cited

U.S. PATENT DOCUMENTS

| | | | | |
|---|---|---|---|---|
| 10,104,338 | B2* | 10/2018 | Goesnar | H04N 5/2226 |
| 10,831,360 | B2* | 11/2020 | Hebbalaguppe | G06F 3/0487 |
| 10,877,597 | B2* | 12/2020 | Kang | G06F 3/038 |
| 10,909,769 | B1* | 2/2021 | Choi | G06T 11/003 |
| 11,303,814 | B2* | 4/2022 | Pallamsetty | G06F 3/011 |
| 2008/0080751 | A1* | 4/2008 | Bee | G06V 40/67 |
| | | | | 382/124 |
| 2017/0192493 | A1* | 7/2017 | Ofek | G06F 3/0304 |
| 2018/0024653 | A1* | 1/2018 | Attarian | G06F 3/0383 |
| | | | | 345/179 |
| 2018/0063482 | A1* | 3/2018 | Goesnar | H04N 23/58 |
| 2019/0026001 | A1* | 1/2019 | Hebbalaguppe | G06T 7/70 |
| 2021/0353371 | A1* | 11/2021 | Kou | A61B 90/37 |

* cited by examiner

*Primary Examiner* — Pritham D Prabhakher
(74) *Attorney, Agent, or Firm* — Terrile, Cannatti & Chambers, LLP; Emmanuel A. Rivera

(57) ABSTRACT

Described are methods and systems for auto framing an object of interest. A webcam of an information handling system captures a full field of view image that has a region of interest (ROI) that includes a pointing element, such as an active pen, user finger, or other such object. The ROI also includes the object of interest. An auto-framing AI/ML model detects the ROI and the pointing element and auto-frames the object of interest to which the pointing element is directed to.

17 Claims, 7 Drawing Sheets

SYSTEM AND METHOD OF ENABLING OBJECT AUTO-FRAMING ON WEBCAM THROUGH AN INDICATOR

BACKGROUND OF THE INVENTION

Field of the Invention

The present invention relates to information handling systems. More specifically, embodiments of the invention provide for auto-framing an object in a field of view taken by a webcam of an information handling system.

Description of the Related Art

As the value and use of information continues to increase, individuals and businesses seek additional ways to process and store information. One option available to users is information handling systems. Information handling systems include personal computers (PC), server computers, desktop computers, notebooks, laptops, etc. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems, such as notebooks and laptops, make use of integrated or connected components such as cameras, including web cameras. Such cameras are used to capture images and video, such as video during web conferencing. In certain instances, it may be desirable to focus on an object in the field of view. Current solutions do not provide for a convenient method to automatically focus or concentrate on an object. There are solutions that provide for facial recognition; however, there are no solutions as to automatically auto-frame objects that are captured.

A user may manually bring the object closer to the webcam or bring the webcam closer to achieve a close-up capture of the object. The object can be out of focus if the webcam does not have proper macro focusing. The user may have to adjust the distance from the object to the webcam, to allow the object to stay in the webcam's focus range. This can be challenging, especially if the object is difficult to move. Pan, tilt, zoom (PTZ) of the webcam can be adjusted to achieve close-up capture of the object; however, this also involves manual intervention by the user.

In certain situations, such as when a user is making a presentation, it may be desirable to maintain and show the entire field of view and not just have a close-up of the object. For example, it may be desirable to show a speaker in the field of view as well as the object.

SUMMARY OF THE INVENTION

A computer-implementable method, system and computer-readable storage medium for auto-framing an object of interest comprising capturing a full field of view image by a webcam; activating an auto-framing AI/ML model; detecting a region of interest (ROI) by the auto-framing AI/ML model; detecting a pointing element in the ROI by the auto-framing AI/ML model; and auto-framing the object of interest to which the pointing element is directed to.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Implementations described herein provide for an auto-framing artificial intelligence/machine learning (AI/ML) model of an information handling system (IHS)/webcam to be applied to an image taken by the webcam of the IHS. The auto-framing AI/ML model can identify a region of interest (ROI) of the image. A pointing element, such as a pen or finger in the ROI, is recognized by the auto-framing AI/ML model. In implementations, where the pen is an interactive device to the IHS, the pen can include controls to zoom in/zoom out of the ROI. An object of interest is also in the ROI. The location of the pointing element as to the object of interest allows the auto-framing AI/ML model to concentrate on or focus on the object of interest. A close-up view can as to the object of interest be provided, as well as picture in picture of the close-up view and the entire field of view of the image.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, gaming, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 1:
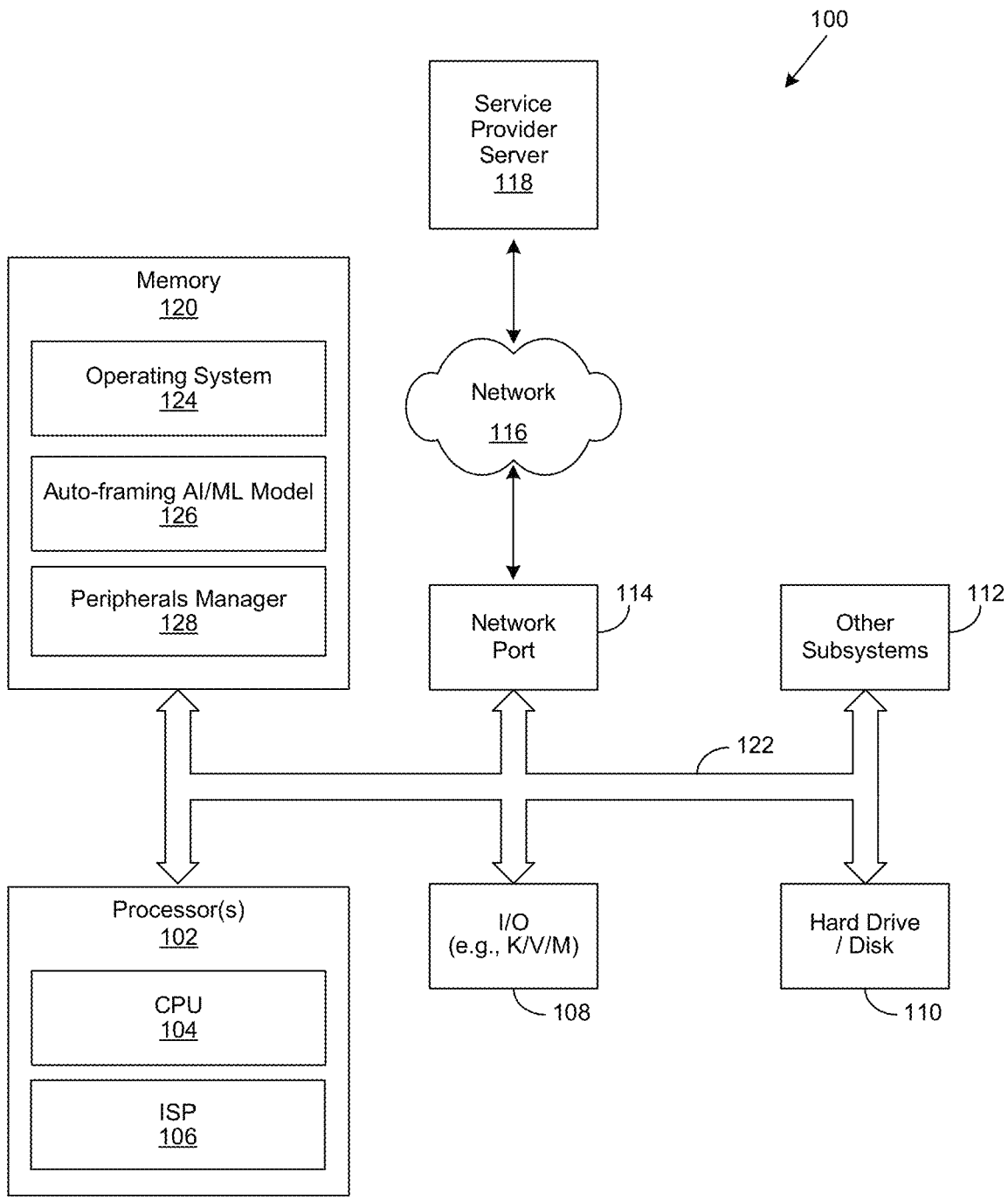
FIG. 1 is a general illustration of components of an information handling system as implemented in the present invention.

FIG. 1 is a generalized illustration of an information handling system 100. The information handling system or IHS 100 can be implemented as a computer, such as a desktop, server, tablet, laptop, or notebook, etc. The information handling system 100 includes processor(s) 102, such as a central processor unit or "CPU" 104 and an image signal processor or "ISP" 106.

The IHS 100 further includes input/output (I/O) devices 108, such as a microphone, a keyboard, a video/display, a mouse, and associated controllers (e.g., K/V/M). In various implementations, I/O devices 108 include a webcam and active pen, as described herein. Implementations provide for such webcams to be externally connected using cables based on standards such as universal serial bus (USB), including USB Type C. A webcam can also be an internally connected device as integrated into a display or laptop. An active pen can be connected wirelessly, such as through a Wi-Fi or Bluetooth connection.

Implementations provide for the IHS 100 to include a hard drive or disk storage 110, and various other subsystems 112. In various embodiments, the information handling system 100 also includes network port 114 operable to connect to a network 116, where network 116 can include one or more wired and wireless networks, including the Internet. Network 116 is likewise accessible by a service provider server 118. The IHS 100 likewise includes system memory 120, which is interconnected to the foregoing via one or more buses 122. System memory 120 can be implemented as hardware, firmware, software, or a combination of such. System memory 120 further includes an operating system (OS) 124.

Embodiments provide for the system memory 120 to include an auto-framing artificial intelligence/machine learning (AI/ML) model 126 used to perform processes as described herein. In certain implementations, the auto-framing AI/ML model 126 is integrated as part of a webcam. System memory 120 can also include a peripherals manager 128.

Figure 2:
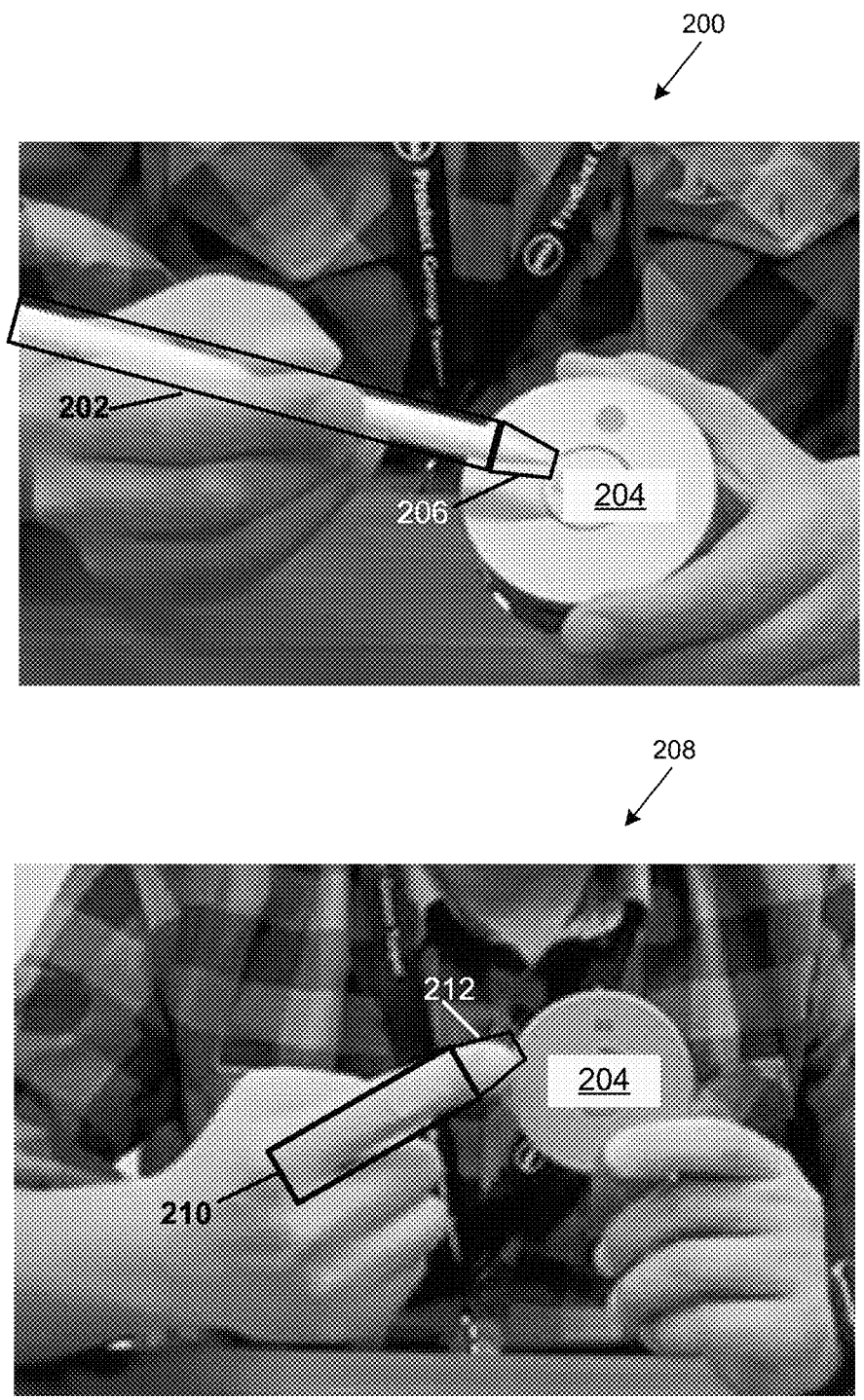
FIG. 2 illustrates images of implementations of the present invention.

FIG. 2 shows images of implementations of the present invention. Image 200 shows an implementation, where a pointing element 202 is used to concentrate on an object of interest 204. The image 200 is taken by a webcam of an IHS, such as IHS 100. Image 200 can be part of a video stream displayed on/by the IHS. Image 200 can be part of a broader field of view image. In particular, image 200 can be considered as a region of interest (ROI).

Embodiments provide for the pointing element 200 to be an active pen as discussed in FIG. 1. Implementations provide for the auto-framing AI/ML model 126 to detect the pointing element 202. Auto-framing AI/ML model 126 or object auto-framing can be enabled when a control/button is activated on the active pen.

Pointing element 202 is configured as an active pen, and the auto-framing AI/ML model 126 detects a specific part of the active pen, such as a tip 206. The tip 206 points to an object of interest 204.

Implementations provide that when the tip 206 is recognized, the ROI/image 200 is identified and auto-framing is performed by zooming in and placing the identified tip 206 at the center of the image 200. As further shown in FIG. 3, an active pen can be configured with controls/buttons to allow a user to zoom in or zoom out from the center of the ROI/image 200. When the user is satisfied with the ROI, using controls on the active pen, the user can disable object auto-framing. The user is then able to move the pointing element 202/tip 206 (e.g., active pen) without detection, such as in a presentation scenario using the active pen as a pointer.

Image 208 shows another implementation, where a user's finger is configured as pointing element 210. The image 208 is taken by a webcam of an IHS, such as IHS 100. Image 200 can be part of a video stream displayed on/by the IHS. Image 208 can be part of a broader field of view image. In particular, image 208 can be considered as a region of interest (ROI).

Other implementations include pointing element 210 to be an unconnected non active device such as a writing pen or pencil. Object auto-framing and the auto-framing AI/ML model 126 can be activated through the peripherals manager 128 as described in FIG. 1. The auto-framing AI/ML model 126 identifies the pointing element 210, and particularly a specific part, such as a tip 212. When the tip 212 is recognized by the auto-framing AI/ML model 126 identifies ROI/image 208, and zooms in and centers the tip 212 in ROI/image 208. In various implementations, when the user holds the tip 212 for a few seconds, the auto-framing AI/ML model 126 recognizes that the tip 212 has not moved. Peripherals manager 128 can perform a predetermined countdown. When the countdown reaches zero, object auto-framing and the auto-framing AI/ML model 126 are disabled. The user is then able to move the pointing element 210/tip 212 (e.g., finger, writing pen, pencil, etc.) without detection, such as in a presentation scenario using the pointing active pen as a pointing element 210 (e.g., finger, writing pen, pencil, etc.) as a pointer.

Figure 3:
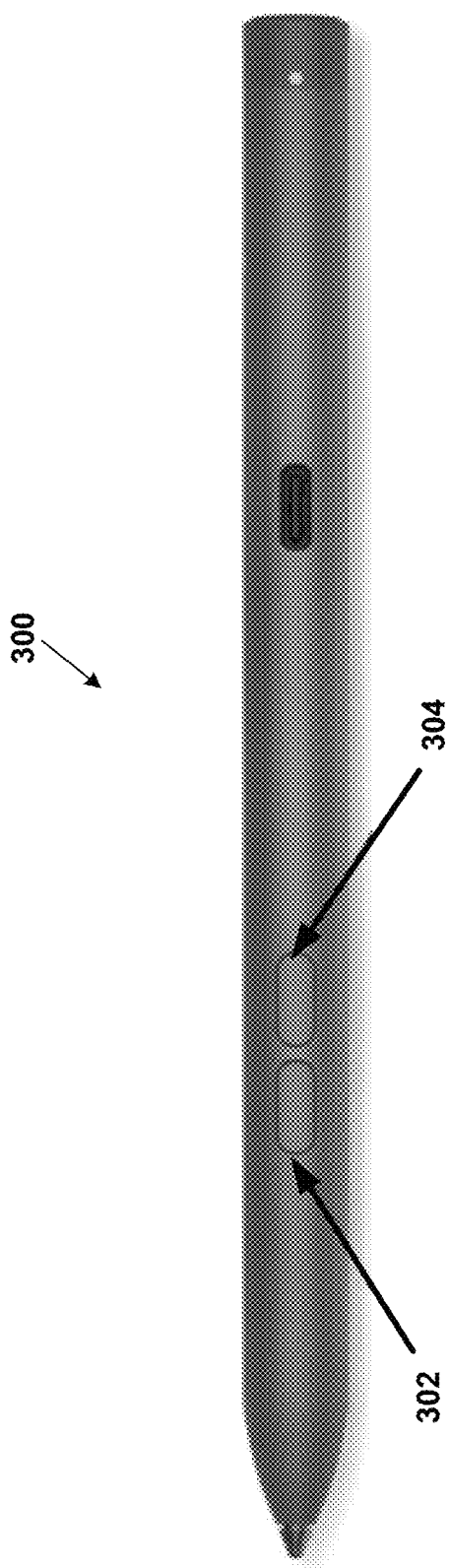
FIG. 3 illustrates an active pen that can be implemented in the invention.

FIG. 3 shows an example of an active pen 300 that can be implemented in the invention. Active pen 300 can be the recognizable pointing element 202 described in FIG. 2. Embodiments provide for active pen to include controls or button 302 and 304.

In certain implementations, button 302 is a bottom barrel button that is a programmable function button to perform for example the following. With a single user click, enable the auto-framing AI/ML model 126 to perform tracking. With a double user click, enable the auto-framing AI/ML model 126 to perform tracking. A user press and holds enables zoom out of an ROI.

In certain implementations, button 304 is a top barrel button that is a programmable function button to perform for example the following. With a single user click, enable the auto-framing AI/ML model 126 to perform tracking. With a double user click, enable the auto-framing AI/ML model 126 to perform tracking. A user press and holds enables zoom in of an ROI.

Figure 4:
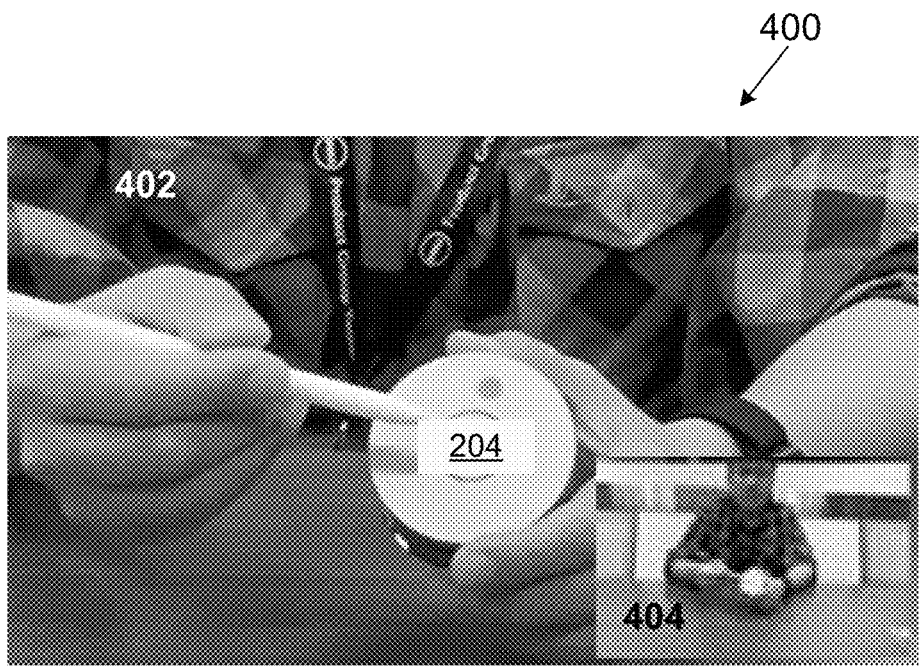
FIG. 4 illustrates images of picture in picture implementations of the present invention.
Figure 4:
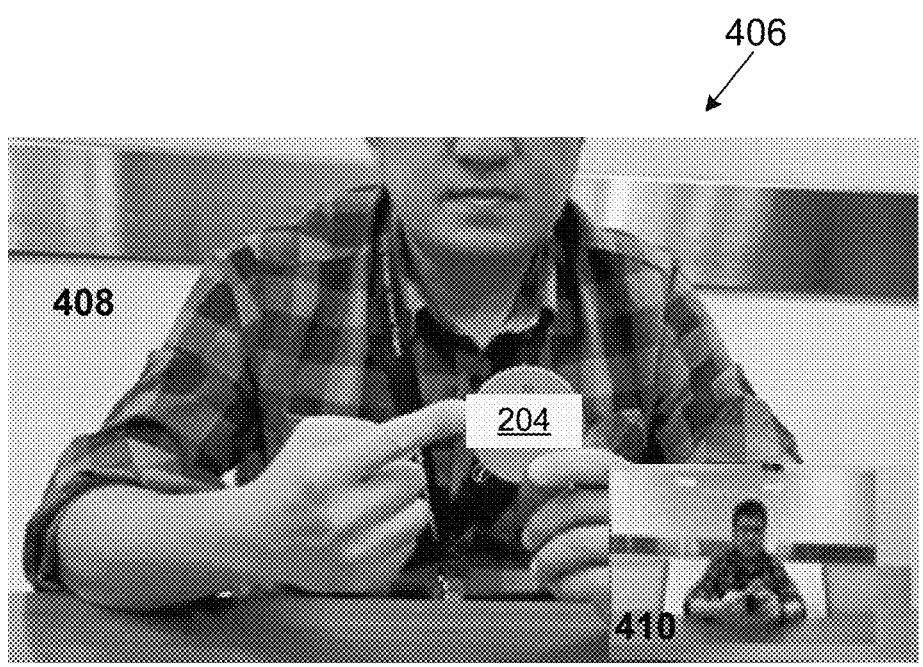

FIG. 4 illustrates images of picture in picture implementations of the present invention. Image 400 shows when an active pen is used as a pointing element to navigate to object of interest 204. The image 400 presents a ROI 402, and a wider field of view image 404 superimposed on the ROI 402. This allows for a user to focus on or emphasize the object interest 204, while presenting the wider field of view image 404. This is helpful in presentation scenarios.

Image 406 shows when a finger, writing pen, pencil, etc. is used as a pointing element to navigate to object of interest 204. The image 406 presents a ROI 408, and a wider field of view image 410 superimposed on the ROI 408. This allows for a user to focus on or emphasize the object interest 204, while presenting the wider field of view image 408. This is helpful in presentation scenarios.

Figure 5:
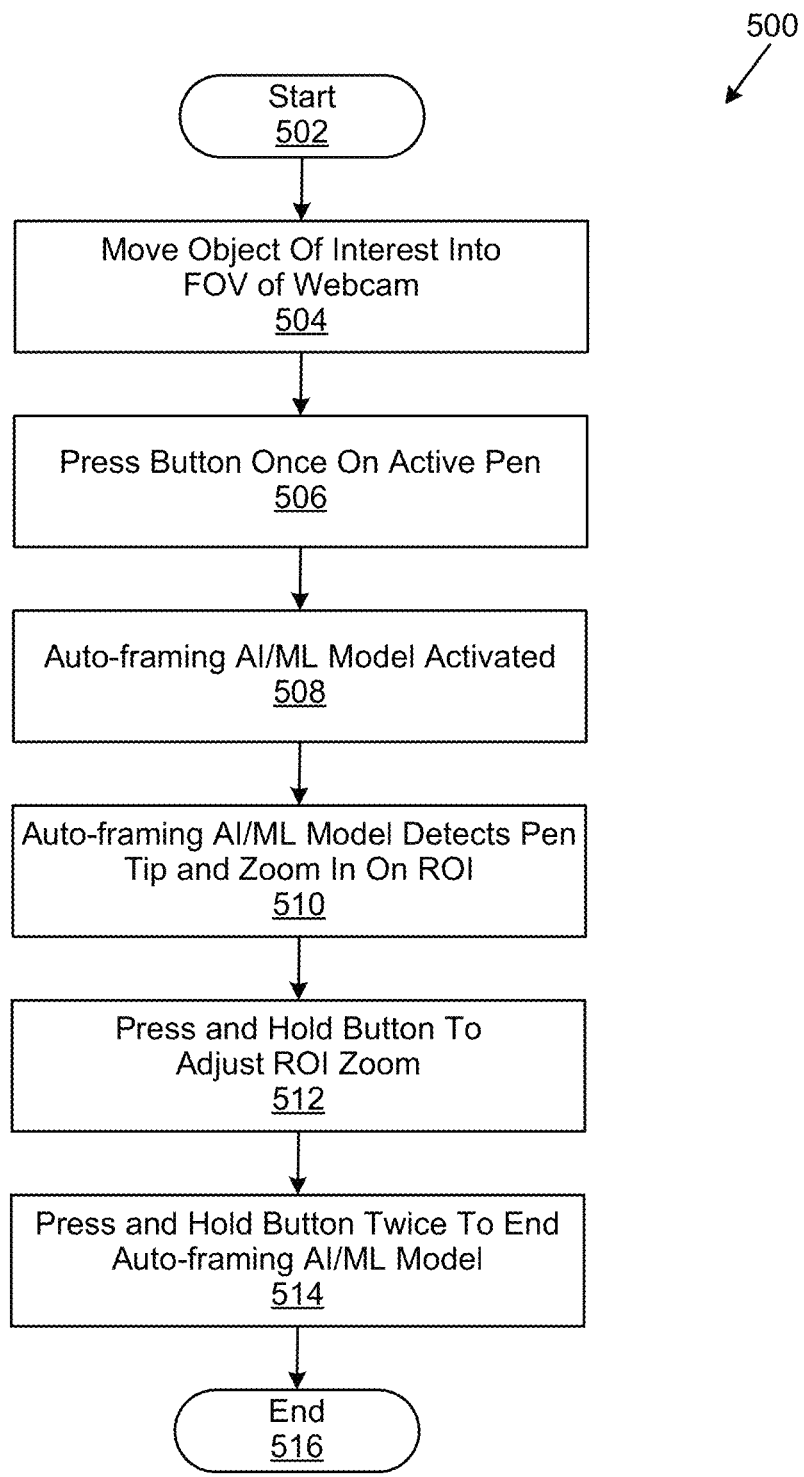
FIG. 5 is a generalized flowchart for auto-framing an object of interest using an active pen as pointing element.

FIG. 5 is a generalized flowchart for auto-framing an object of interest using an active pen as pointing element. The order in which the method is described is not intended to be construed as a limitation, and any number of the described steps may be combined in any order to implement the method, or alternate method. Additionally, individual steps may be deleted from the method without departing from the spirit and scope of the subject matter described herein. Furthermore, the method may be implemented in any suitable hardware, software, firmware, or a combination thereof, without departing from the scope of the invention.

At step 502, the process 500 starts. At step 504, an object of interest 204 is moved into a field of view of a webcam, such as a webcam of IHS 100. At step 506, a button on an active pen, such as active pen 300 is pressed once. For example, the button can be button 302 or button 304. At step 508, the auto-framing AI/ML model 126 is activated to perform tracking. At step 510, the auto-framing AI/ML model 126 detects a pen tip, such as tip 206 and zooms in on a ROI and object of interest 204 of an image captured by the webcam. At step 512, a button (e.g., button 302 or button 304) on an active pen 300 is held down to adjust ROI zoom. At step 514, a button (e.g., button 302 or button 304) on an active pen 300 is pressed twice to deactivate/end auto-framing AI/ML model 126. At step 516, the process 500 ends.

Figure 6:
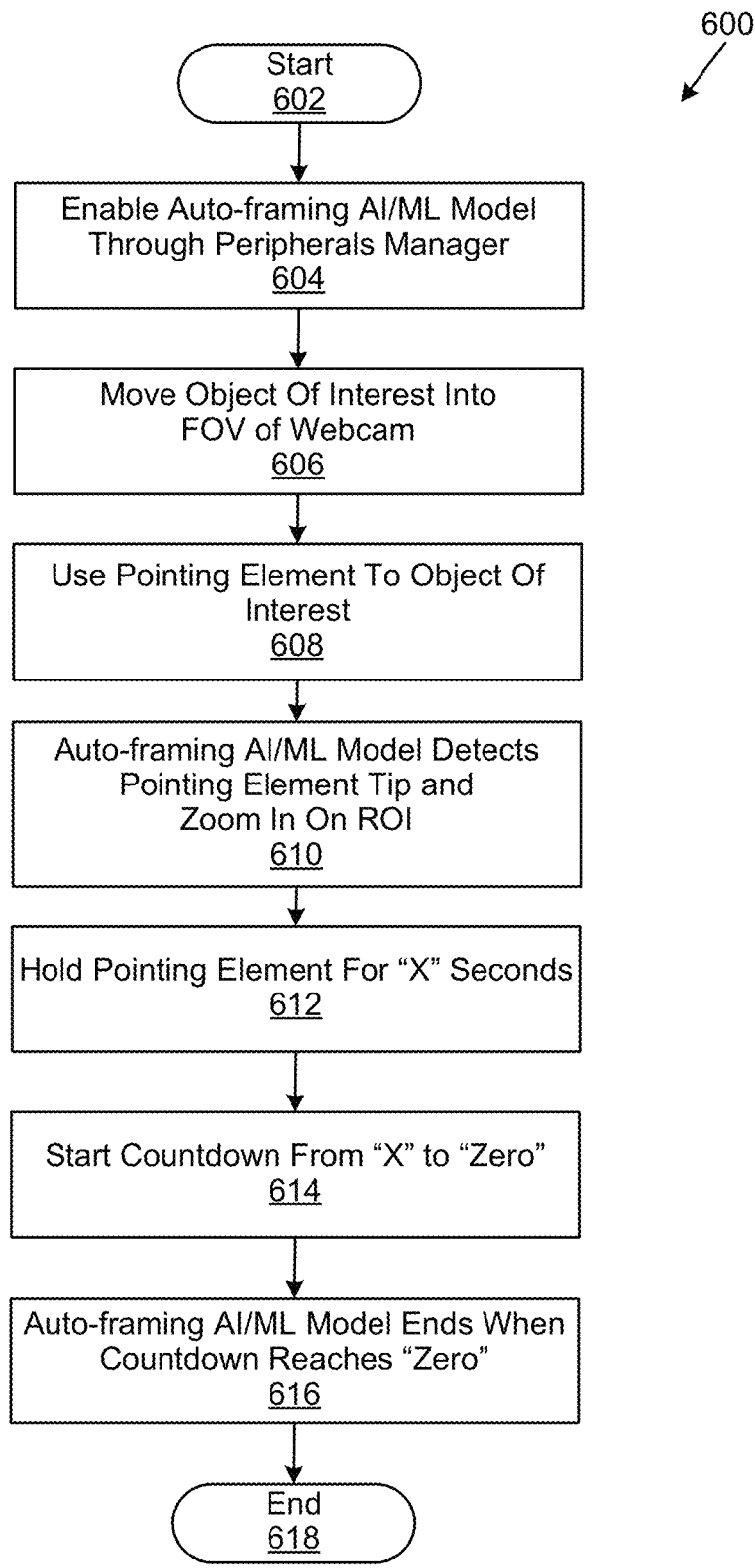
FIG. 6 is a generalized flowchart for auto-framing an object of interest using a finger, writing pen, pencil or inactive device as a pointing element.

FIG. 6 is a generalized flowchart for auto-framing an object of interest using a finger, writing pen, pencil or inactive device as a pointing element. The order in which the method is described is not intended to be construed as a limitation, and any number of the described steps may be combined in any order to implement the method, or alternate method. Additionally, individual steps may be deleted from the method without departing from the spirit and scope of the subject matter described herein. Furthermore, the method may be implemented in any suitable hardware, software, firmware, or a combination thereof, without departing from the scope of the invention.

At step 602, the process 600 starts. At step 604, the auto-framing AI/ML model 126 is enabled for example, through peripherals manager 128. At step 606, object of interest 204 is moved into a field of view of a webcam, such as a webcam of IHS 100. At step 608, using a pointing element such as finger, writing pen, pencil or inactive device, and particularly a tip (e.g., tip 212), object of interest 204 is emphasized. At step 610, the auto-framing AI/ML model 126 detects the tip 212 and zooms in on ROI. At step 612, the tip is held for "X" seconds (e.g., 3 seconds). At step 614, a countdown is performed from "X" seconds (e.g., 3 seconds) to "Zero" seconds. At step 616, when the countdown reaches "Zero" seconds, the auto-framing AI/ML model 126.

Although, the processes described herein are directed to focusing in on a ROI and an object of interest, and zooming in the object of interest, it is contemplated that concentrating on and identifying an object of interest can be used to provide directional control of microphones implemented with an IHS 100. In other words, by identifying an object of interest, directional microphones can be directed towards the object of interest.

Figure 7:
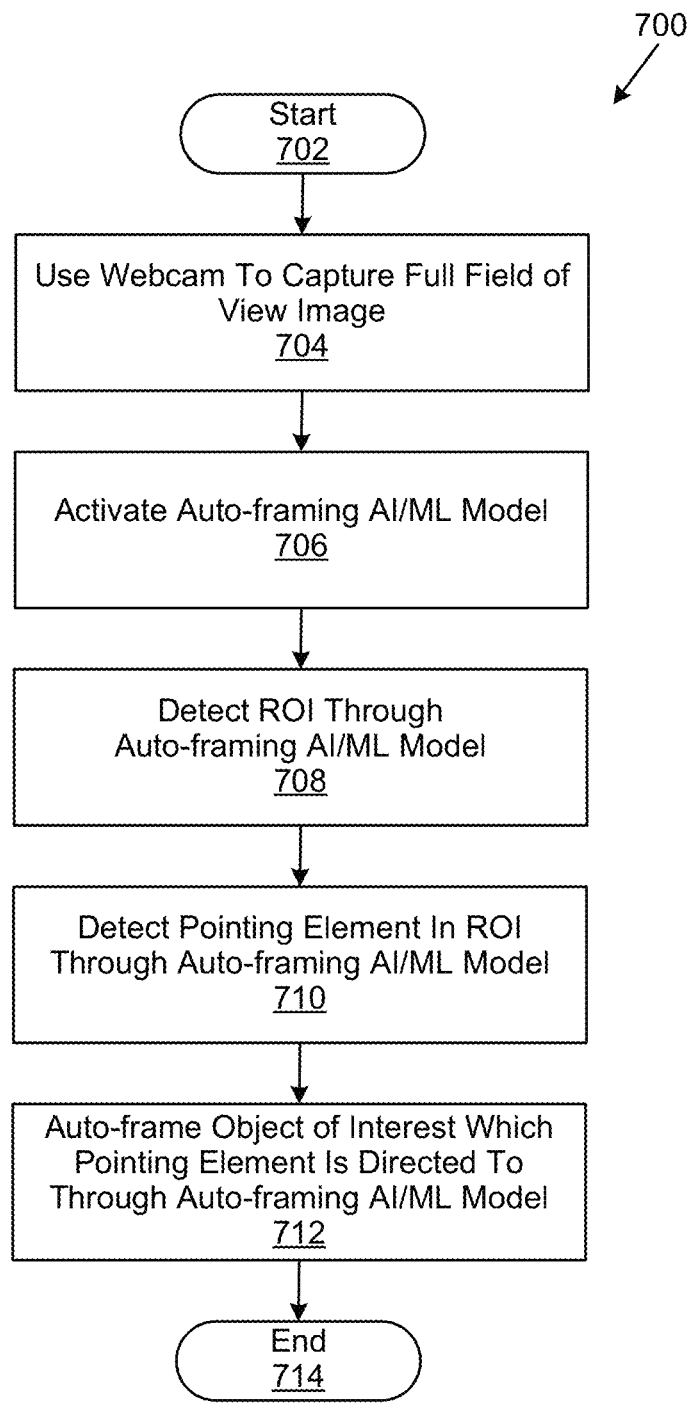
FIG. 7 is a generalized flowchart for auto-framing an object in a field of view taken by a webcam of an information handling system.

FIG. 7 is a generalized flowchart for auto-framing an object in a field a view taken by a webcam of an information handling system. The order in which the method is described is not intended to be construed as a limitation, and any number of the described steps may be combined in any order to implement the method, or alternate method. Additionally, individual steps may be deleted from the method without departing from the spirit and scope of the subject matter described herein. Furthermore, the method may be implemented in any suitable hardware, software, firmware, or a combination thereof, without departing from the scope of the invention.

At step 702, the process 700 starts. At step 704, a webcam, such as a webcam of the IHS 100 is used to capture a full field of view image. At step 706, the auto-framing AI/ML model 126 is activated. At step 708, a region of interest (ROI) of the full field of view image is detected by the auto-framing AI/ML model 126. At step 710, the auto-framing AI/ML model 126 detects in the ROI a pointing element such as pointing elements 202 and 210, and particularly tips 206 and 212. At step 712, an object of interest (e.g., object of interest 204) is auto-framed. The pointing element is directed to object of interest. At step 714, the process 700 ends.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Embodiments of the invention are described with reference to flowchart illustrations and/or step diagrams of methods, apparatus (systems) and computer program products according to embodiments of the invention. It will be understood that each step of the flowchart illustrations and/or step diagrams, and combinations of steps in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram step or steps.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram step or steps.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for auto-framing an object of interest comprising:
    capturing a full field of view image by a webcam of an information handling system (IHS);
    activating an auto-framing artificial intelligence/machine learning (AI/ML) model integrated into the webcam by a peripheral manager of the IHS, to perform object auto-framing to focus on the object of interest, wherein the AI/ML model performs:
    detecting a region of interest (ROI);
    detecting a pointing element in the ROI;
    auto-framing the object of interest to which the pointing element is directed to; and
    deactivating the auto-framing AI/ML model by the peripheral manager of the IHS.

2. The computer-implementable method of claim 1, wherein the pointing element is an active pen, and activating is performed by depressing a control on the active pen.

3. The computer-implementable method of claim 1, wherein the pointing element is user finger, writing pen, or pencil, and activating is through a peripherals manager of an information handling system connected to the webcam.

4. The computer-implementable method of claim 1, wherein the deactivating is through an active pen, wherein depressing a control on the active ends the auto-framing AI/ML model.

5. The computer-implementable method of claim 1, wherein the deactivating is performed after a time the pointing element is held steady.

6. The computer-implementable method of claim 1 further comprising providing a picture in picture view of the ROI and the full field of view image.

7. An information handling system (IHS) comprising:
    a processor;
    a data bus coupled to the processor; and
    a non-transitory, computer-readable storage medium embodying computer program code, the non-transitory, computer-readable storage medium being coupled to the data bus, the computer program code interacting with a plurality of computer operations for auto-framing an object of interest comprising instructions executable by the processor and configured for:
    capturing a full field of view image by a webcam of the information handling system (IHS);
    activating an auto-framing artificial intelligence/machine learning (AI/ML) model integrated into the webcam by a peripheral manager of the IHS, to perform object auto-framing to focus on the object of interest, wherein the AI/ML model performs:
    detecting a region of interest (ROI);
    detecting a pointing element in the ROI;
    auto-framing the object of interest to which the pointing element is directed to; and
    deactivating the auto-framing AI/ML model by the peripheral manager of the IHS.

8. The information handling system (IHS) of claim 7, wherein the pointing element is an active pen, and activating is performed by depressing a control on the active pen.

9. The information handling system (IHS) of claim 7, wherein the pointing element is user finger, writing pen, or pencil, and activating is through a peripherals manager of the information handling system connected to the webcam.

10. The information handling system (IHS) of claim 7, wherein the deactivating is through an active pen, wherein depressing a control on the active ends the auto-framing AI/ML model.

11. The information handling system (IHS) of claim 7, wherein the deactivating is performed after a time the pointing element is held steady.

12. The information handling system (IHS) of claim 7 further comprising providing a picture in picture view of the ROI and the full field of view image.

13. A non-transitory, computer-readable storage medium embodying computer program code for auto-framing an object of interest, the computer program code comprising computer executable instructions configured for:
    capturing a full field of view image by a webcam of an information handling system (IHS);
    activating an auto-framing artificial intelligence/machine learning (AI/ML) model integrated into the webcam by a peripheral manager of the IHS, to perform object auto-framing to focus on the object of interest, wherein the AI/ML model performs:
    detecting a region of interest (ROI);
    detecting a pointing element in the ROI;
    auto-framing the object of interest to which the pointing element is directed to; and
    deactivating the auto-framing AI/ML model by the peripheral manager of the IHS.

14. The non-transitory, computer-readable storage medium of claim 13, wherein the pointing element is an active pen, and activating is performed by depressing a control on the active pen.

15. The non-transitory, computer-readable storage medium of claim 13, wherein the pointing element is user finger, writing pen, or pencil, and activating is through a peripherals manager of an information handling system connected to the webcam.

16. The non-transitory, computer-readable storage medium of claim 13, wherein the deactivating is through an active pen, wherein depressing a control on the active ends the auto-framing AI/ML model.

17. The non-transitory, computer-readable storage medium of claim 13, wherein the deactivating is performed after a time the pointing element is held steady.

* * * * *